United States Patent [19]

Chemali et al.

[11] Patent Number: 4,918,669

[45] Date of Patent: Apr. 17, 1990

[54] METHOD AND APPARATUS FOR SONIC DIP MEASUREMENT

[75] Inventors: Roland E. Chemali; Voldi E. Maki, Jr., both of Austin, Tex.

[73] Assignee: Halliburton Logging Services, Inc., Houston, Tex.

[21] Appl. No.: 385,045

[22] Filed: Jul. 26, 1989

Related U.S. Application Data

[63] Continuation of Ser. No. 176,686, Apr. 1, 1988, abandoned.

[51] Int. Cl.$^4$ .............................................. G01V 1/40
[52] U.S. Cl. ...................................... 367/27; 181/104
[58] Field of Search ............................ 367/25, 27, 35; 181/102, 104, 105

[56] References Cited

U.S. PATENT DOCUMENTS

| | | | |
|---|---|---|---|
| 3,191,141 | 6/1965 | Schuster | 367/27 |
| 3,376,950 | 4/1968 | Grime | 367/28 |
| 3,526,874 | 9/1970 | Schuster | 367/30 |
| 3,542,150 | 11/1970 | Youmens et al. | 181/104 |
| 4,346,406 | 8/1982 | Schuster | 367/27 |
| 4,495,605 | 1/1985 | Desbrcuches | 367/27 |

*Primary Examiner*—Thomas H. Tarcza
*Assistant Examiner*—Ian J. Lobo
*Attorney, Agent, or Firm*—William J. Beard

[57] ABSTRACT

A method and apparatus are disclosed for measurement of earth formation dip utilizing sonic techniques. At least three electroacoustic devices are utilized, each having an electroacoustic transmitter and a pair of electroacoustic receivers. The electroacoustic receivers are both located on one side of the transmitter and are preferably located vertically adjacent along a line with the transmitter. Transmitted acoustic energy is detected by the receivers and the elapsed time between detection by a first receiver and detection by a second receiver is determined. A correlation of the variations in elapsed times for each of the three electroacoustic devices is then utilized to calculate the formation dip at various depths.

8 Claims, 2 Drawing Sheets

METHOD AND APPARATUS FOR SONIC DIP MEASUREMENT

This application is a continuation of application Ser. No. 176,686 filed Apr. 1, 1988, now abandoned.

BACKGROUND OF THE INVENTION

1. Field of the Invention

This invention relates in general to methods and apparatus for measuring earth formation dip and in particular to methods and apparatus for measuring earth formation dip which utilize sonic techniques.

2. Description of the Prior Art

The measurement of dip in earth formations is generally performed by comparing logs obtained by at least three separate pads mounted on a sonde and facing angularly spaced portions of a borehole wall. The measurements obtained are resistive in nature and are largely immune to the effects of borehole rugosity and mudcake buildup. Due to the resistive nature of the measurement involved it is necessary to have an excellent conductive interface between the pad and the formation. This condition is not possible in boreholes in which oil based mud is utilized. Field experience has shown that oil based mud forms a thin irregular layer of insulation between the pad and the borehole wall which prevents electrical current from entering the formation. The only known attempt in the prior art to solve this problem utilizing resistive measurement techniques involves the implementation of spines or "scratchers" on each pad to establish electrical conductivity with the formation. This has not proven to be a successful solution.

U.S. Pat. No. 3,388,323 attempts to solve the problem of oil based mud measurements by measuring dip utilizing magnetic measurements. Still other attempts at solving this problem have utilized acoustic waves which are propagated through the geological formations along a direction substantially parallel to the borehole. Examples of this type of dip measurement are disclosed in U.S. Pat. Nos. 4,495,605; 3,526,874; 3,376,950 and 3,295,100. None of the aforementioned systems have met with commercial success. Therefore, it should be obvious that a need exists for a dip meter capable of operation in highly resistive oil based muds.

SUMMARY OF THE INVENTION

It is therefore one object of the present invention to provide an improved method and apparatus for measuring earth formation dip.

It is another object of the present invention to provide an improved method and apparatus for measuring earth formation dip which will operate in highly resistive oil based muds.

It is yet another object of the present invention to provide an improved method and apparatus for measuring earth formation dip which utilizes sonic techniques.

The foregoing objects are achieved as is now described. The method and apparatus of the present invention utilizes sonic techniques to measure earth formation dip. At least three electroacoustic devices are utilized, each having an electroacoustic transmitter and two electroacoustic receivers. Each electroacoustic device is preferably located on a flexibly mounted pad and utilizes two receivers located on the same side of the transmitter and closely spaced in vertical alignment. Transmitted acoustic energy is detected by both receivers and the elapsed time between detection at the first receiver and detection at the second receiver is determined. A correlation of the variations in elapsed times for each of the three electroacoustic devices is then utilized to calculate the formation dip.

The above as well as additional objects, features, and advantages of the invention will become apparent in the following detailed description.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
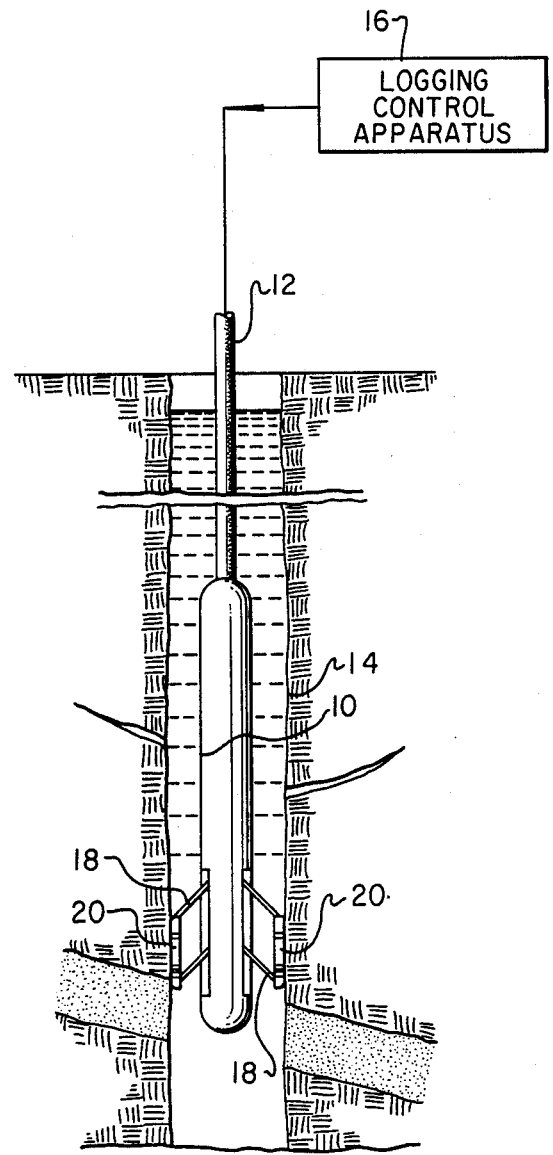
FIG. 1 is a schematic representation of the sonic dipmeter of the present invention in a borehole.

With reference now to the figures and in particular with reference to FIG. 1, there is depicted a schematic representation of sonic dipmeter 10 of the present invention which is suspended by means of logging cable 12 in borehole 14. As can be seen, sonic dipmeter 10 includes a plurality of pads 20, each pad being flexibly mounted to sonic dipmeter 10 by mechanical arms 18. Mechanical arms 18 are preferably mounted in a manner necessary to urge pads 20 into contact with the borehole wall utilizing springs or other mechanical bias means. In a preferred embodiment of the present invention sonic dipmeter 10 must include at least three pads 20 since it is necessary to determine three points in order to define a plane. In more complex embodiments of the present invention, sonic dipmeter 10 may include a larger number of pads, such as four or six.

Those skilled in the art will appreciate that sonic dipmeter 10 preferably also includes sensors within the sonde for determining the angle and azimuthal direction of the sonde during logging so that the angle and azimuthal direction of the dip in earth formations may be determined. In practice, sonic dipmeter 10 is lowered into a borehole 14 and a plurality of pads 20 is then urged against the inner wall of borehole 14 by mechanical arms 18. As sonic dipmeter 10 is drawn through borehole 14 a plurality of measurements are taken in accordance with the present invention and the resultant data is transmitted via a telemetry system (not shown) up logging cable 12 to logging control apparatus 16. The processing of this data is accomplished within logging control apparatus 16 in a manner well known in the art.

Figure 2:
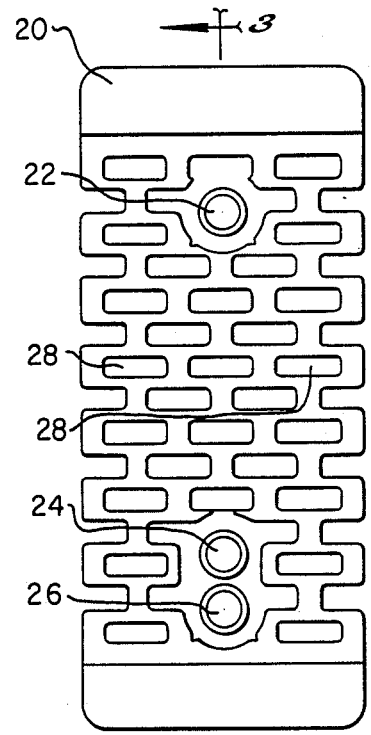
FIG. 2 is a pictorial representation of a pad utilized with the sonic dipmeter of the present invention.

With reference now to FIG. 2, there is depicted a pictorial representation of pad 20 which may be utilized with sonic dipmeter 10 of the present invention. As can be seen, pad 20 includes a transmitter transducer 22 which is preferably utilized to transmit an acoustic pulse in the range of 100-200 kilohertz. In one embodiment of the present invention transmitter transducer 22 is preferably implemented utilizing a piezoelectric disk shaped transducer with sufficiently broad band characteristics to produce a short duration pulse.

Also depicted in FIG. 2 are receiver transducers 24 and 26. As can be seen, receiver transducers 24 and 26 are preferably located vertically adjacent along a line which passes through transmitter transducer 22. As above, receiver transducers 24 and 26 are preferably implemented utilizing piezoelectric disk shaped transducers. In actual practice, the spacing between receiver transducer 24 and 26 will determine the vertical resolution of sonic dipmeter 10 and the distance between transmitter transducer 22 and the midpoint between receiver transducers 24 and 26 will determine the depth of investigation of sonic dipmeter 10. This distance must preferably be greater than one inch to avoid mudcake interference. Thus, it will be preferable to minimize the distance between the centers of receiver transducer 24 and 26. Experimentation has shown that this spacing should be less than one inch. In a preferred embodiment of the present invention the spacing between the center of receiver transducer 24 and receiver transducer 26 is less than one-half inch. While this places certain restrictions on the type of transducer which may be utilized, it has proven to be an optimum spacing for increasing the vertical resolution of sonic dipmeter 10.

As can also be seen in FIG. 2, pad 20 includes a plurality of slots 28 which are utilized, in a manner well known in the acoustic tool art, to attenuate and delay the direct arrival of a pulse signal transmitted from transmitter transducer 22 in order to optimize the signal received by receiver transducers 24 and 26 from the formation.

Figure 3:
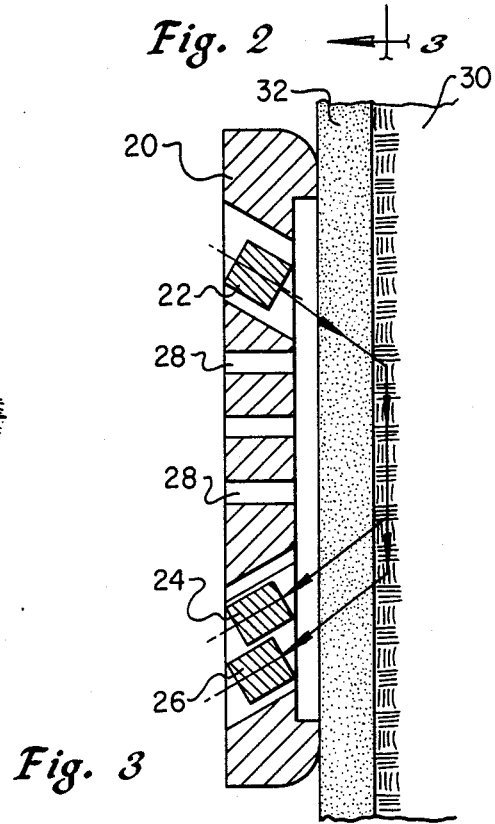
FIG. 3 is a side view of the sonic dipmeter pad in contact with a geological formation.

Referring now to FIG. 3, there is depicted a side view of pad 20 in contact with a geological formation 30. As can be seen, geological formation 30 includes a mudcake section 32 which, as discussed above, represents an insulating layer which might otherwise prove deleterious to dip measurement. As can be seen, transmitter transducer 22, when energized, will transmit acoustic pulse in the frequency range of 100-200 kilohertz which will propagate into geological formation 30. The sonic signal thus generated will propagate downward through geological formation 30 and back through mudcake section 32 to impinge on receiver transducers 24 and 26. As illustrated in a schematic sense in FIG. 3, the difference in elapsed time between the arrival of this electroacoustic signal at receiver transducer 24 and its arrival at receiver transducer 26 will be almost entirely attributed to a delay in propagation through geological formation 30. Thus, geological formation 30 may be characterized by the elapsed time between the arrival of the electroacoustic signal at receiver transducer 24 and the arrival of that signal at receiver transducer 26. In this manner, variations in this elapsed time measurement may be utilized to provide an excellent indication of variations in propagation time through geological formation 30, indicative of a bed or other change in the formation.

Those skilled in the dipmeter art will appreciate that these variations in elapsed time between arrival of the electroacoustic signal at receiver transducer 24 and its arrival at receiver transducer 26 may be then correlated for each pad 20 and the resultant calculations may be utilized to determine the dip in earth formations surrounding borehole 14.

Figure 4:
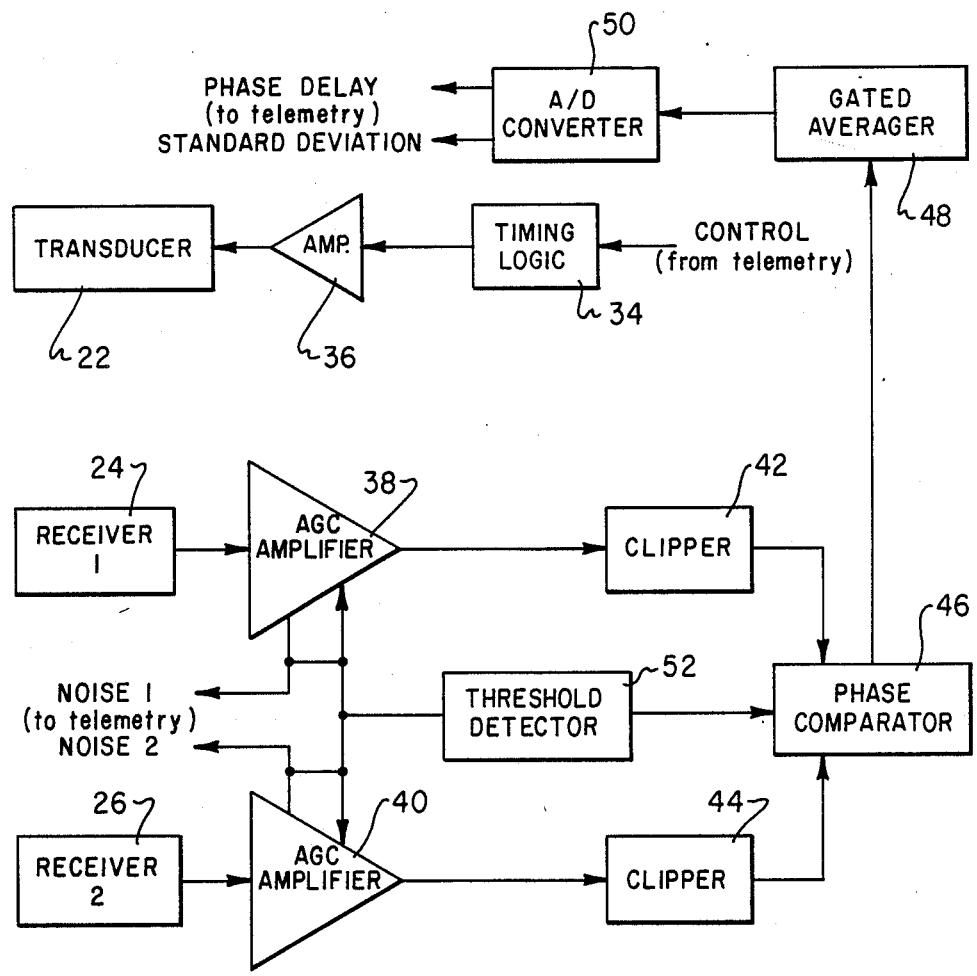
FIG. 4 is a block diagram of one embodiment of the sonic dipmeter of the present invention.

With reference now to FIG. 4, there is depicted a block diagram of one embodiment of sonic dipmeter 10 of the present invention. As can be seen, transmitter transducer 22 is utilized to produce a pulse of acoustic energy into geological formation 30 in accordance with a control signal from logging control apparatus 16 (see FIG. 1). This control signal is coupled to timing logic block 34 and the resultant pulse is amplified by amplifier 36 and output via transmitter transducer 22. The outputs of receiver transducer 24 and receiver transducer 26 are shown coupled to automatic gain control amplifiers 38 and 40. As is depicted, a portion of the output of automatic gain control amplifiers 38 and 40 representative of a noise signal is coupled back to logging control apparatus 16 (see FIG. 1) to provide an indication of the background noise level which is measured between pulses. The output of automatic gain control amplifiers 38 and 40 is then coupled to clipper 42 and 44 which is utilized to output a digital one or a digital zero depending on signal polarity. Threshold detector 52 is utilized to indicate the first arrival of acoustic pulse signals above the background noise and to initiate a phase measurement.

Phase comparator 46 is preferably utilized to effectively measure the elapsed time between the arrival of an acoustic pulse at receiver transducer 24 and its arrival at receiver transducer 26 by measuring the difference in phase between the signals thus received. Since the minimum formation velocity expected will result in less than a three hundred and sixty degree phase shift, those skilled in the art will appreciate that the phase shift measured between the signal incident at receiver transducer 24 and that incident at receiver transducer 26 will be directly proportional to the elapsed time between the arrival of an acoustic pulse at receiver transducer 24 and its arrival at receiver transducer 26. The output of phase comparator 46 is then coupled to gated averager 48. The elapsed time values and deviations therefrom obtained over a plurality of consecutive cycles are determined in gated averager 48 and an average elapsed time is transmitted via analog-to-digital convertor 50 and telemetry circuitry to logging control apparatus 16 (see FIG. 1). In a preferred embodiment of the present invention a standard deviation from this average is also calculated and is similarly transmitted in order to provide an indication of the expected reliability of the measurement thus performed.

Those skilled in the art will appreciate that alternate methods of calculating the elapsed time between the arrival of an acoustic pulse at receiver transducer 24 and its arrival at receiver transducer 26 may also be utilized. One such example is the utilization of a downhole correlator which may calculate the correlation function of the signals received at receiver transducer 24 and receiver transducer 26. The correlation of these two signals can then also be related to the elapsed time between the arrival of the signals. Another example is the utilization of a least-mean-square adaptive algorithm which may be utilized to calculate time delay estimation.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method for determining the dip in earth formations traversed by a borehole, comprising the steps of:
   transmitting acoustic energy in the frequency range of 100 to 200 kilohertz through a formation radially with respect to the axis of a borehole from at least three angularly spaced points relative to the borehole axis;
   generating first and second electrical receiver signals, respectively, representative of and in response to the arrival of acoustic energy at first and second longitudinally spaced locations from each respective transmission point, at each of said three angularly spaced points wherein said first and second locations are spaced vertically by a spacing distance of one inch or less, said spacing distance being chosen to be about one wavelength or less of acoustic energy at the highest operating frequency of 200 kHz in the slowest expected formation to be encountered; and
   measuring the difference in elapsed time between the arrival of said first and second acoustic signals at each of the three angularly spaced points by measuring the acoustic wave phase shift between said representative electrical receiver signals at various depths along the borehole wherein the dip in the earth formation traversed by said borehole may be determined by correlating variation in the difference in elapsed time between said first and second acoustic signals for each of said transmission points.

2. A method for determining the dip in earth formations traversed by a borehole according to claim 1 further including the step of:
   transmitting the difference in elapsed time between said first and second representative electrical signals to the earth's surface for recording thereof.

3. Apparatus for determining the dip in earth formations traversed by a borehole comprising:
   a sonde adapted for longitudinal movement through a borehole;
   at least three electroacoustic devices carried by said sonde, each of said electroacoustic devices including a piezoelectric transmitter operating in the frequency range from 100 to 200 kilohertz and a pair of electroacoustic receivers disposed longitudinally distant from said transmitter and vertically spaced apart from each other by one inch or less, said spacing distance being chosen to be about one wavelength or less of acoustic energy at the highest operating frequency of 200 kHz in the slowest expected formation to be encountered;
   control means for causing each of said transmitters to transmit burst acoustic energy in the frequency range of 100 to 200 kilohertz radially with respect to the axis of said borehole through an earth formation;
   means for determining the elapsed time between the detection of acoustic energy by a first of each of said pair of said spaced apart electroacoustic receivers and a second of each of said pair of said spaced apart electroacoustic receivers by measuring the phase shift of the acoustic waves between said spaced apart receivers; and
   means for determining the dip in said earth formation by correlating variations in said elapsed time between the detection of acoustic energy at a first of each of said pair of said spaced apart electroacoustic receivers and a second of each of said pair of said spaced apart electroacoustic receivers at various depths along the well borehole.

4. Apparatus for determining the dip in earth formation traversed by a borehole according to claim 3 wherein each of said electroacoustic receivers includes an automatic gain control amplifier.

5. Apparatus for determining the dip in earth formation traversed by a borehole according to claim 3 wherein each of said three electroacoustic devices includes a metallic pad and means for urging said metallic pad into contact with said borehole.

6. Apparatus for determining the dip in earth formation traversed by a borehole according to claim 5 wherein each of said metallic pads includes a plurality of slots for delaying direct transmission of acoustic energy from said electroacoustic transmitter to said pair of electroacoustic receivers.

7. Apparatus for determining the dip in earth formation traversed by a borehole according to claim 3 wherein each of said pair of electroacoustic receivers comprises a piezoelectric transducer.

8. Apparatus for determining the dip in earth formation traversed by a borehole according to claim 3 wherein each of said pair of electroacoustic receivers is inclined toward said electroacoustic transmitter.

* * * * *